Patented Mar. 7, 1950

2,499,548

UNITED STATES PATENT OFFICE 2,499,548

DRILLING FLUIDS AND METHODS OF USING SAME

Cary R. Wagner, Utica, Ohio, and William N. Axe, Bartlesville, Okla., assignors to Phillips Petroleum Company, a corporation of Delaware No Drawing. Application November 16, 1945, Serial No. 629,203

16 Claims. (Cl. 252—8.5)

This invention relates to drilling fluids. In one of its more specific aspects, it relates to a drilling fluid comprising water soluble aminocellulose or its acid derivative which is not precipitated nor regenerated in any substantial degree by dilution with water and/or the usual salt containing connate water of an oil well formation nor by the heat or cold generally obtainable in a well. In another specific aspect, it relates to a drilling fluid comprising water soluble aminocellulose and aminocellulose derivatives such as the acid derivatives of aminocellulose; and to the methods of use of such aminocellulose or its acid derivative for controlling viscosity, gel strength, water loss and filter cake thickness of oil well drilling fluids. In another specific aspect it relates to positive colloid drilling muds and the drilling of heaving shale with such positive colloid drilling muds.

In the art of drilling wells, especially drilling wells by the rotary method, it is necessary to use a drilling mud or drilling fluid, as is well understood in the art. The drilling mud lubricates the drill stem, carries the cuttings to the surface of the well, cools the drill bit, and forms a filter cake on the walls of the well preventing loss of at least any substantial amount of water from the drilling mud to the natural formations of the well. In order to perform these important functions properly, the drilling mud must have suitable viscosity and other qualities at all times in spite of adverse conditions encountered in drilling the well.

Sometimes in drilling through certain substantially water soluble formations, which formations are dissolved and dispersed by the action of the drill bit, the drilling fluid has its viscosity raised too high so that gas bubbles will not escape properly from the drilling fluid especially if the initial gel strength is high, which tends to lighten the drilling mud and increase the danger of a blow-out. Also, the increased viscosity causes a loss of power in rotating the bit and in extreme cases may result in twisting the drill string in half. The control of viscosity provided by the present invention is, therefore, important.

Drilling fluids contaminated by said substantially water soluble formations also often form filter cakes on the formation which are too thick and/or too hard. A thick filter cake is also generally an indication of excessive loss of water to the formation. Pure water, suitable for drilling, is hard to obtain in some locations, but everywhere its loss to the formation is to be avoided as such lost water is absorbed by the formation and may cause heaving or swelling of the formation. A thick filter cake is easily knocked off by movements of the drill string, especially if hard and brittle, with resultant further water loss at the bare spot and possible jamming of the bit in the hole by falling pieces of filter cake. The ideal filter cake is very thin, quite soft and flexible and prevents substantially any water loss.

Drilling muds are contaminated by, and may be automatically made muddy by material native to the formation in which the well is drilled, although it is often necessary to add additional material to the mud which will increase the specific gravity in order to increase the weight of the column of mud in the well and thereby offset the effect of high gas pressure. For this purpose weighting materials such as iron oxide and barytes are commonly used. Every natural clay contains particles of many orders of magnitude, some being coarse enough to settle out of a water suspension quickly and others being fine enough to stay suspended for indefinite periods. In a clay that is considered good for drilling mud purposes the fine material is predominant and is in an indefinitely fine state of subdivision, the finest being so small that much or most of it can be said to be in the form of a colloidal suspension or dispersion when the clay has been mixed with water. The suspended particles obey the general rules of colloidal dispersions, the degree of dispersion being increased by some ions and chemicals and being decreased by others. An increase in the degree of dispersion is termed "deflocculation" and a decrease in the state of dispersion is termed "flocculations." Flocculated clay may be in an equally finely divided state to that of deflocculated clay but the flocculated material will come together in flocculent, loose clumps or aggregates which settle readily from the medium in which it is dispersed, which in the case of drilling muds, is generally water. The stability of colloidal dispersions is also directly related to the charges on the dispersed particles. In general it may be said that strongly charged negative or positive particles form stable dispersions, whereas weakly charged or neutral particles tend to flocculate and settle out of the disperse medium.

When drilling in some formations such as, for example, certain shale formations, considerable difficulty has been experienced due to the property of these shale formations of swelling and sloughing when contacted with water or ordinary drilling mud. This property of some formations to hydrate or absorb water and swell sometimes occurs to such an extent that the holes cave and fill to such a degree that in the end the drilling has to be abandoned. Formations which have this property of absorbing water and swelling are, in the well drilling art, generally termed "heaving-shale" formations and it is with these types of formations that this invention is particularly concerned.

Colloidally dispersed clay, obeying the general rules of colloidal dispersions, carries an electrical charge. Practically all naturally occurring finely divided clays such as kaolin and bentonite carry negative charges on the dispersed particles when dispersed in an aqueous medium. It is known that the shale in heaving-shale formation is generally bentonitic in character and that upon being dispersed in water carries a negative charge. It has been found that if the colloidally dispersed particles in drilling muds are positively instead of negatively charged, the swelling of heaving-shale can be prevented or lessened to a great extent.

The principal object of our invention is to produce a drilling mud which can be used in all formations with reduced water loss, thin filter cake, and controlled viscosity and gel strength.

Another object is to provide an improved drilling fluid.

Another object is to provide an improved method of drilling.

Another object is to provide a drilling mud additive suitable for controlling viscosity, gel strength, water and filter cake thickness of well drilling fluids.

Another object is to provide a drilling mud containing water soluble aminocellulose or its acid derivatives which are not precipitated nor regenerated in any substantial degree by dilution with water and/or connate water.

Another object is to provide an improved drilling mud which will prevent the heaving of heaving-shale formations.

Another object is to provide a mud containing positively charged colloidal particles.

Numerous other objects and advantages of this invention will be apparent to those skilled in the art upon reading the accompanying specification and claims.

In the present invention we prefer to employ as a colloidal suspending or dispersing agent in a drilling mud water soluble aminocellulose or its acid derivatives. Such aminocellulose or its acid derivatives is not precipitated or regenerated by dilution with water and/or the usual salt containing connate water. Nor is it precipitated by heat or cold generally obtainable in a well, or regenerated by aging or ripening as it is a substantially stable substance. Substances which precipitate or regenerate under the above conditions we find are not suitable for use in drilling mud, although they may find some use as plugging agents for plugging wells, and, therefore, are not related to the present invention. Such plugging agents would soon precipitate and fill the mud pit and also choke the drill stem in the hole.

The amount of said water soluble aminocellulose or its acid derivatives employed is not critical as even small amounts give a corresponding smaller effect.

The cellulose may be in dried powder form, the particle size not being critical. However, for rapid solution a particle size where 95% will pass an 80 mesh screen is useful. In order to speed up the solution of the chosen water soluble aminocellulose or its acid derivatives, a suitable wetting agent may be added first.

In rotary drilling the methods consist in adding the aminocellulose or its acid derivatives powder, which may be added to the drilling fluid flowing in the mud ditch to the pump intake; or to the mud pit; by scattering the powder over the surface. An alternative method would be to make up a more or less concentrated solution of the aminocellulose or its acid derivatives and add that in a stream to the drilling mud. In some instances, a pure mixture of water and the aminocellulose or its acid derivatives may be used as the well drilling or well controlling fluid, but mud is generally added. The drilling fluid containing the aminocellulose or its acid derivatives and water is pumped in circulation or reverse circulation in the drill string or used to fill or partially fill the well in the usual operations of well drilling and well controlling of the prior art. When so used in a sufficient amount, a new result is achieved in that salt water does not cut the mud qualities enough to harm it for drilling and formations exposed to it do not cave or heave enough to stop the drilling. Suitable control or mud treating agents may be used, such as phosphates and/or quebracho if desired.

Aminocellulose or various degrees of amination may be prepared by treating cellulose nitrates with sodium, potassium, lithium, caesium or rubidium amide in liquid ammonia. Obviously, only sodium amide or potassium amide are used commercially as the other alkali metals are too expensive.

The exact reaction is not known, but the following have been suggested (only a single glucose unit is depicted):

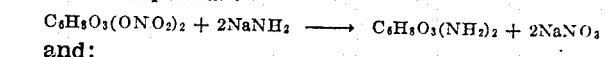

and:

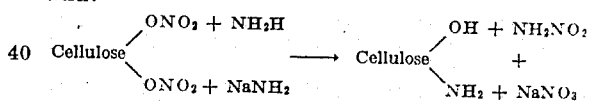

Regardless of how aminocellulose is made, it is soluble in water and also in alkalis or in acids and makes a usefull drilling mud.

By treating aminocellulose with a relatively strong mineral acid, such as hydrochloric, sulphuric, nitric, or phosphoric acid, an acid derivative is formed which has the unusual property of being a positive colloid suitable for use in positive colloid drilling muds suitable for use in drilling through a heaving shale formation without heaving of the shale occurring. The bulky portion of the molecule, which is perhaps hydrogen aminocellulose of colloidal size, possesses a positive charge instead of the usual negative charge associated with the colloids of many drilling muds. For example, with hydrochloric acid:

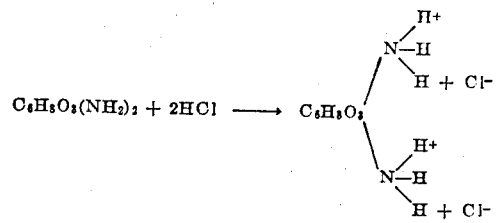

(aminocellulose + hydrochloric acid = positive colloidal ion and negative chlorine ions).

Any use of water soluble aminocellulose or its acid derivatives to be retained as a soluble dispersing agent throughout the entire normal life of the drilling mud is not to be confused with the use of some alkali or acid soluble cellulose which is to be precipitated as an insoluble plugging agent in the formation. Nor is the use of water soluble aminocellulose or its acid derivatives which is substantially stable to heat or cold or aging or ripening or dilution by water or salts of connate water to be confused with plugging agents which are deliberately precipitated by such heat or cold or aging or dilution. We do not use our water soluble aminocellulose or its acid derivatives as a plugging agent at all, and while minor reactions in the well may form a colloidal haze of supposedly insoluble cellulose and while this colloidal cellulose may contact the formation, such minor traces of colloidal material is not comparable to the immediate precipitation of relatively massive insoluble plugging material formed by alkali or acid soluble celluloses upon removal or dilution of the alkali or acid. The haze of insoluble cellulose formed from water soluble aminocellulose or its acid derivatives is colloidal and does not precipitate under ordinary conditions.

The mode or theory of operation by which the soluble aminocellulose or its acid derivatives protect the surface of clay or bentonite from attack by water is obscure, but it is believed that as the water attempts to enter the clay the aminocellulose or its acid derivatives forms a layer of a protective material on the outside of the clay or bentonite preventing the clay or bentonite from absorbing the water from the drilling mud.

Positive colloid mixtures have been prepared which possess all of the properties desirable in a drilling mud for penetrating heaving shale. These positive colloid muds are stable and they can be weighted to almost any desired specific gravity. They can be given any viscosity or thixotropic gel strength required, within reasonable limits. They have excellent filtration, or wall-sealing properties. They are not affected by relative high temperatures. They cost, initially, a little more than silicate muds, but they have many advantages over silicate muds. They have electrical resistivities approximately equal to the resistivity of shale, which is highly desirable when the hole is to be logged electrically. Best of all, these positive colloid muds are true colloidal mixtures, which have no swelling or disintegrating effect on heaving shale.

Acid derivatives of aminocellulose, for example, the hydrochloride of aminocellulose mentioned above, is a valuable positive colloid material for use in such positive colloid muds. All such derivatives of aminocellulose are regarded as included by the term aminocellulose. And, all water soluble aminocelluloses are useful in some degree in drilling muds. The acid derivatives may be used along with all the dyes and other materials mentioned as useful in positive colloid muds in U. S. Patents Nos. 2,273,925 of February 24, 1942, and 2,354,648 of August 1, 1944, to Donald C. Bond, entitled respectively, "Stabilized drilling mud" and "Drilling mud," such as bentonite which has been altered until it is a positive colloid material, and mentioned in other patents.

In the preparation of drilling mud it is generally desirable to use a finely divided solid which will have a high colloidal dispersion in water so as to produce a viscous, relatively stable mud with a minimum amount of solids. Bentonite has the aforesaid property and has been found to be a particularly satisfactory clay for use in drilling mud. Like other similar clays, bentonite carries a negative electrical charge when colloidally dispersed in an aqueous medium.

It has been found that such negatively charged colloids may be changed to positive colloids by the addition of one or more suitable water soluble chemical compounds from the group: salts of metals wherein the positive valence is three or more, such as thorium, aluminum, cerium and lanthanum salts; acid proteins such as acid gelatin or casein; basic dyes such as methylene blue, methylene green, methylene grey, methyl violet, Bismarck brown R, rhodamine B, arcriflavine, chrysoidin Y and chrysoidin R. By the addition of one or more of the foregoing materials, the negatively charged colloidal clay or bentonite may be first neutralized and flocculated and upon a further addition, the neutralized clay may be deflocculated and remain in a stable dispersed state as positively charged particles. It is not desirable to use the flocculated, neutralized particles in drilling mud since these particles are not stably dispersed, the particles readily settling from an aqueous dispersion medium. When such a positively charged clay as, for example, bentonite, is dispersed in water and used as drilling mud, the shale in heaving-shale formations does not swell or slough off into the hole and the bentonite particles remain stably dispersed. The ability of the positively charged bentonite to prevent swelling of the shale is believed to be due to neutralization of the negative charges on the shale particles in the subsurface formation by the positive charges on the bentonite in the drilling mud with resultant formation of a flocculated film of shale and bentonite on the exposed surface of the shale formation in the bore hole. The flocculated material forms an extremely coherent layer and adheres tightly to the surface of the formation, thus substantially preventing further neutralization of charges between the clay of the shale formation and the bentonite in the drilling mud and at the same time substantially preventing the ingress of further water to the formation, thereby preventing hydration and swelling of the heaving shale.

Drilling muds containing water soluble aminocellulose or its acid derivatives are not subject to injury by salt to any detrimental degree, but may still be useful as drilling muds when there is as much in some instances as 275,000 parts per million of sodium chloride in the drilling mud or more.

Drilling muds containing water soluble aminocellulose or its acid derivatives often have low initial gel strength which allows gas bubbles to come out of the drilling mud so rapidly that the drilling mud will not become gas cut. Elimination of gas cutting reduces the chances of blowouts. Drilling muds containing water soluble aminocellulose or its acid derivatives are often characterized by very thin filter cake thickness and by very small water loss or complete absence of water loss. This is very useful in avoiding loss of water to the formation, as well as the resultant swelling or caving of the formation which occurs with some formations. They do not generally ferment or spoil.

A solution of 4 pounds of aminocellulose per barrel of water was mixed with greater than the usual maximum proportions of caustic soda, phosphates (commercially sold as "Calgon") and/or quebracho as used in starch drilling mud and no changes were observed. The tests were made with both one and two chemicals added to the solution, and with sodium carboxymethylcellulose. Similar tests were made with the hydrochloride of aminocellulose, acids and salts, and thus both types were shown useful in drilling muds.

The above simple experiments are merely representative and are given merely to show why drilling muds containing water soluble aminocellulose or its acid derivatives with or without alkali metal, or any class of metal, halogen salts, are valuable in drilling where salt contamination, or heaving or caving conditions or both, are encountered.

It is understood that while a theory of operation has been advanced, it is not the only or necessary one, but has been advanced only to facilitate the disclosure. It is understood, however, that this invention is not limited to any theory of operation or action. It is further obvious that various changes may be made in the details without departing from the spirit of this invention, nor from the scope of the invention as defined in the following claims. Obviously, use in aqueous mud laden fluids includes use in the aqueous phase of an emulsion with non-aqueous material. It is understood the invention is not to be limited to the specific details described. For example, certain reactions in the well may form a white haze of colloidal nature in the solution and the solution will still be substantially water soluble aminocellulose or its acid derivatives. For example, the tests with treating and control agents indicate that water soluble aminocellulose or its acid derivative are somewhat inert chemically and that all the treating and control agents of the well drilling fluid and well controlling fluid arts may, after a simple test for solubility and lack of obvious adverse reaction, be employed without invention in our aminocellulose or its acid derivatives drilling and controlling fluids, and that with few if any exceptions they will be so employable. Our invention is, therefore, to be defined by the following claims.

Having described our invention, we claim:

1. In a process of drilling wells comprising the steps of drilling the well with well drilling tools and circulating through the well during said drilling a water base drilling mud which forms a filter cake on the wall of the well, the improvement comprising incorporating in said drilling mud a water soluble cellulose selected from the group consisting of aminocellulose and the salts formed by the addition reactions between aminocellulose and strong mineral acids in an amount sufficient to reduce the water loss due to the filtration through said filter cake but insufficient to increase the viscosity of said drilling mud to such an extent that it cannot be circulated.

2. A water base drilling mud comprising in combination sufficient water to maintain the mud as a fluid, sufficient clayey material to form a filter cake on the wall of the well, and a water soluble cellulose selected from the group consisting of aminocellulose and the salts formed by the addition reactions between aminocellulose and strong mineral acids in an amount sufficient to reduce the water loss due to filtration through said filter cake without increasing the viscosity of said well drilling mud to such an extent that it cannot be circulated.

3. A water base drilling mud comprising an aqueous fluid mixture containing suspended solids which form a filter cake on the wall of the well, and a water soluble cellulose selected from the group consisting of aminocellulose and the salts formed by the addition reactions between aminocellulose and strong mineral acids in an amount sufficient to reduce the water loss through said filter cake without increasing the viscosity of said well drilling mud to such an extent that it cannot be circulated.

4. In a process of drilling wells comprising the steps of drilling the well with well drilling tools and circulating through the well during said drilling a water base drilling mud which forms a filter cake on the wall of the well, the improvement comprising incorporating in said drilling mud a water soluble salt formed by the addition reaction between aminocellulose and hydrochloric acid in an amount sufficient to reduce the water loss due to the filtration through said filter cake but insufficient to increase the viscosity of said drilling mud to such an extent that it cannot be circulated.

5. A water base drilling mud comprising in combination sufficient water to maintain the mud as a fluid, sufficient clayey material to form a filter cake on the wall of the well, and a water soluble salt formed by the addition reaction between aminocellulose and hydrochloric acid in an amount sufficient to reduce the water loss due to filtration through said filter cake without increasing the viscosity of said well drilling mud to such an extent that it cannot be circulated.

6. A water base drilling mud comprising an aqueous fluid mixture containing suspended solids which form a filter cake on the wall of the well, and a water soluble salt formed by the addition reaction between aminocellulose and hydrochloric acid in an amount sufficient to reduce the water loss through said filter cake without increasing the viscosity of said well drilling mud to such an extent that it cannot be circulated.

7. In a process of drilling wells comprising the steps of drilling the well with well drilling tools and circulating through the well during said drilling a water base drilling mud which forms a filter cake on the wall of the well, the improvement comprising incorporating in said drilling mud a water soluble salt formed by the addition reaction between aminocellulose and sulfuric acid in an amount sufficient to reduce the water loss due to the filtration through said filter cake but insufficient to increase the viscosity of said drilling mud to such an extent that it cannot be circulated.

8. A water base drilling mud comprising in combination sufficient water to maintain the mud as a fluid, sufficient clayey material to form a filter cake on the wall of the well and a water soluble salt formed by the addition reaction between aminocellulose and sulfuric acid in an amount sufficient to reduce the water loss due to filtration through said filter cake without increasing the viscosity of said well drilling mud to such an extent that it cannot be circulated.

9. A water base drilling mud comprising an aqueous fluid mixture containing suspended solids which form a filter cake on the wall of the well, and a water soluble salt formed by the addition reaction between aminocellulose and sulfuric acid in an amount sufficient to reduce the water loss through said filter cake without increasing the viscosity of said well drilling mud to such an extent that it cannot be circulated.

10. In a process of drilling wells comprising the steps of drilling the well with well drilling tools, and circulating through the well during said drilling a water base drilling mud which forms a filter cake on the wall of the well, the improvement comprising incorporating in said drilling mud water soluble aminocellulose in an amount sufficient to reduce the water loss due to filtration through said filter cake but insufficient to increase the viscosity of said drilling mud to such an extent that it cannot be circulated.

11. A water base drilling mud comprising in combination sufficient water to maintain the mud as a fluid, sufficient clayey material to form a filter cake on the wall of the well, and water soluble aminocellulose in an amount sufficient to reduce the water loss due to filtration through said filter cake without increasing the viscosity of said well drilling mud to such an extent that it cannot be circulated.

12. A water base drilling mud comprising an aqueous fluid mixture containing suspended solids which form a filter cake on the wall of the well, and water soluble aminocellulose in an amount sufficient to reduce the water loss through said filter cake without increasing the viscosity of said well drilling mud to such an extent that it cannot be circulated.

13. A water base drilling mud comprising in combination sufficient water to maintain the mud as a fluid, sufficient clayey material to form a filter cake on the wall of the well, and a water soluble salt formed by the addition reaction between aminocellulose and nitric acid in an amount sufficient to reduce the water loss due to filtration through said filter cake without increasing the viscosity of said well drilling mud to such an extent that it cannot be circulated.

14. A water base drilling mud comprising in combination sufficient water to maintain the mud as a fluid, sufficient clayey material to form a filter cake on the wall of the well, and a water soluble salt formed by the additional reaction between aminocellulose and phosphoric acid in an amount sufficient to reduce the water loss due to filtration through said filter cake without increasing the viscosity of said well drilling mud to such an extent that it cannot be circulated.

15. A water base drilling mud comprising an aqueous fluid mixture containing suspended solids which form a filter cake on the wall of the well, and a water soluble salt formed by the addition reaction between aminocellulose and nitric acid in an amount sufficient to reduce the water loss through said filter cake without increasing the viscosity of said well drilling mud to such an extent that it cannot be circulated.

16. A water base drilling mud comprising an aqueous fluid mixture containing suspended solids which form a filter cake on the wall of the well, and a water soluble salt formed by the addition reaction between aminocellulose and phosphoric acid in an amount sufficient to reduce the water loss through said filter cake without increasing the viscosity of said well drilling mud to such an extent that it cannot be circulated.

CARY R. WAGNER.
WILLIAM N. AXE.

REFERENCES CITED

The following references are of record in the file of this patent:

UNITED STATES PATENTS

| Number | Name | Date |
|---|---|---|
| 1,947,464 | Dreyfus | Feb. 20, 1934 |
| 2,129,913 | Cross et al. | Sept. 12, 1938 |
| 2,273,925 | Bond et al. | Feb. 24, 1942 |
| 2,336,171 | Freeland et al. | Dec. 7, 1943 |
| 2,337,296 | Kennedy et al. | Dec. 21, 1943 |
| 2,364,434 | Foster | Dec. 5, 1944 |
| 2,425,768 | Wagner | Aug. 19, 1947 |

OTHER REFERENCES

Cheeney: A Review of Recent Advances in Drilling Mud Control, article in The Oil Weekly, Nov. 23, 1942, pages 25, 26, 28, 32, 34, 36, 38, 40 and 42.

Bond: Positive Colloid Muds, article in Petroleum Technology, Jan. 1944, pages 1 to 10.

Perkins: The Effects of Certain Gums and Starches on the Filtration of Salt-Water Muds, article in The Oil Weekly, Nov. 2, 1942, page 45.

Mullin et al.: Aminocellulose, article in The Textile Colorist, Dec. 1931, pages 834–837.

Heuser: The Chemistry of Cellulose, pages 222 and 223, published 1944 by John Wiley & Sons of New York city.